(12) United States Patent
Yaumi et al.

(10) Patent No.: US 8,545,781 B1
(45) Date of Patent: Oct. 1, 2013

(54) CARBON DIOXIDE ADSORBENT COMPOSITION

(71) Applicant: King Fahd University of Petroleum and Minerals, Dhahran (SA)

(72) Inventors: Ali Lawan Yaumi, Khobar (SA); Reyad Awwad Khalaf Shawabkeh, Dhahran (SA); Ibnelwaleed Ali Hussein, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/647,291

(22) Filed: Oct. 8, 2012

(51) Int. Cl.
*B01D 53/62* (2006.01)
*C09K 3/00* (2006.01)

(52) U.S. Cl.
USPC ............. 423/220; 423/230; 95/139; 252/184; 252/189; 252/190

(58) Field of Classification Search
USPC .................. 423/220, 230; 95/139; 252/184, 252/189, 190
See application file for complete search history.

(56) References Cited

U.S. PATENT DOCUMENTS

| | | | |
|---|---|---|---|
| 6,155,965 A | 12/2000 | Santen et al. | |
| 7,770,640 B2 | 8/2010 | Kresnyak et al. | |
| 2001/0023655 A1 | 9/2001 | Knopf et al. | |
| 2009/0280046 A1 | 11/2009 | Reddy et al. | |
| 2010/0021362 A1 * | 1/2010 | Hunwick | 423/230 |
| 2010/0282595 A1 | 11/2010 | Whellock | |
| 2011/0038774 A1 * | 2/2011 | Zhong | 423/234 |

FOREIGN PATENT DOCUMENTS

JP 2002-205027 7/2002

OTHER PUBLICATIONS

M.L. Gray, Y. Soong, K.J. Champagne, John Baltrus, P.W. Stevens Jr., P. Toochinda, S.S.C. Chuang, "CO2 capture by amine-enriched fly ash carbon sorbents," *Separation and Purification Technology* 35 (2004) 31-36.

M. Mercedes Maroto-Valer, Zhe Lu, Yinzhi Zhang, Zhong Tang, "Sorbents for CO2 capture from high carbon fly ashes," *Waste Management* 28 (2008) 2320-2326.

* cited by examiner

*Primary Examiner* — Timothy Vanoy
(74) *Attorney, Agent, or Firm* — Richard C Litman

(57) ABSTRACT

The carbon dioxide adsorbent composition relates to a material that will adsorb carbon dioxide gas from the atmosphere and that is made by the treatment of oil fly ash with ammonium hydroxide. In order to make the carbon dioxide adsorbent, oil fly ash is first mixed with ammonium hydroxide. This mixture is then refluxed and cooled. Additional ammonium hydroxide is added to the cooled mixture of oil fly ash and ammonium hydroxide to form a secondary mixture. This forms an amine-functionalized fly ash composition, which is then filtered from the secondary mixture to be used as a carbon dioxide adsorbent composition. The carbon dioxide adsorbent composition is then dried and may be used as a carbon dioxide adsorbent for gas streams, such as flues and exhaust systems, containing carbon dioxide.

9 Claims, 5 Drawing Sheets

CARBON DIOXIDE ADSORBENT COMPOSITION

BACKGROUND OF THE INVENTION

1. Field of the Invention

The present invention relates to materials for reducing air pollution, and particularly to a carbon dioxide adsorbent composition made by the treatment of oil fly ash with ammonium hydroxide.

2. Description of the Related Art

Fly ash is one of the residues generated in combustion, and is formed from the fine particles that rise with the flue gases. Fly ash is generally captured by electrostatic precipitators or other particulate filtration equipment before the flue gases reach the chimneys of coal-fired power plants. Depending upon the source and makeup of the coal being burned, the components of fly ash vary considerably, but all fly ash includes substantial amounts of silicon dioxide ($SiO_2$) (both amorphous and crystalline) and calcium oxide (CaO), both being endemic ingredients in many coal-bearing rock strata.

Fly ash is typically seen as an environmental hazard and is considered a waste product with little to no reclamation potential. Water desalination processes, in particular, create large quantities of fly ash, typically in the form of carbon-rich flue ash. Power plants also produce large quantities of such carbon-rich fly ash, typically from crude and heavy oil processes. For example, in Saudi Arabia, water desalination plants and power plants, which are typically fueled by crude oil or heavy oil, produce large amounts of fly ash daily that may have a carbon content of 80%-90%, the remainder being oxides of silicon, aluminum, nickel, vanadium and iron. Most of this fly ash is treated as waste, and is disposed of at landfills.

Due to the environmental hazards of producing fly ash and disposal of fly ash as a common byproduct of many industrial processes, it would be desirable to provide a method for recycling the fly ash into useful compositions. It would be even more desirable to be able to recycle the fly ash into a composition that could be used to reduce carbon emissions from other processes, thus greatly increasing the environmental aid given by the recycling of the fly ash.

Carbon dioxide is currently considered an air pollutant and a major contributor to the greenhouse effect. Carbon dioxide gas released by the combustion of fossil fuels in motor vehicles and by factories is a prime source of such pollution. A great deal of research is currently devoted to developing materials that will reduce the emission of carbon dioxide from power plants, factories, and motor vehicle emissions.

Thus, a carbon dioxide adsorbent composition solving the aforementioned problems is desired.

SUMMARY OF THE INVENTION

The carbon dioxide adsorbent composition relates to a material that will adsorb carbon dioxide gas from the atmosphere and that is made by the treatment of oil fly ash with ammonium hydroxide. In order to make the carbon dioxide adsorbent, oil fly ash is first mixed with ammonium hydroxide. This mixture is then refluxed and cooled. Additional ammonium hydroxide is added to the cooled mixture of oil fly ash and ammonium hydroxide to form a secondary mixture. This forms an amine-functionalized fly ash composition, which is then filtered from the secondary mixture to be used as a carbon dioxide adsorbent composition. The carbon dioxide adsorbent composition is then dried and may be used as a carbon dioxide adsorbent for gas streams, such as flues and exhaust systems, containing carbon dioxide.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The carbon dioxide adsorbent composition relates to a material that will adsorb carbon dioxide gas from the atmosphere and that is made by the treatment of oil fly ash with ammonium hydroxide. In order to make the carbon dioxide adsorbent, oil fly ash is first mixed with ammonium hydroxide. This mixture is then refluxed and cooled. Additional ammonium hydroxide is added to the cooled mixture of oil fly ash and ammonium hydroxide to form a secondary mixture. This forms an amine-functionalized fly ash composition, which is then filtered from the secondary mixture to be used as a carbon dioxide adsorbent composition. The carbon dioxide adsorbent composition is then dried and may be used as a carbon dioxide adsorbent for gas streams, such as flues and exhaust systems, containing carbon dioxide.

The following example illustrates preparation of the present carbon dioxide absorbent composition. It will be understood that the example is exemplary, and may be scaled up to produce the desired quantity of material. A 100 gram sample of oil fly ash was mixed into 300 ml of ammonium hydroxide in a 500 ml round bottom flask. This mixture was then refluxed at a temperature of 120° C. for 24 hours. The mixture was then cooled to room temperature, and 150 ml of ammonium hydroxide was added. This secondary mixture was allowed to sit for a period of 24 hours at room temperature to form the carbon dioxide adsorbent composition as a precipitate. The carbon dioxide adsorbent composition precipitate was then filtered, and half of the mixture was dried at 105° C. for 24 hours in an oven, while the other half was dried at room temperature. Fourier transform infrared spectroscopy (FTIR) analysis was carried out on the final product to confirm the presence of amine functional groups on the surface.

Figure 1:
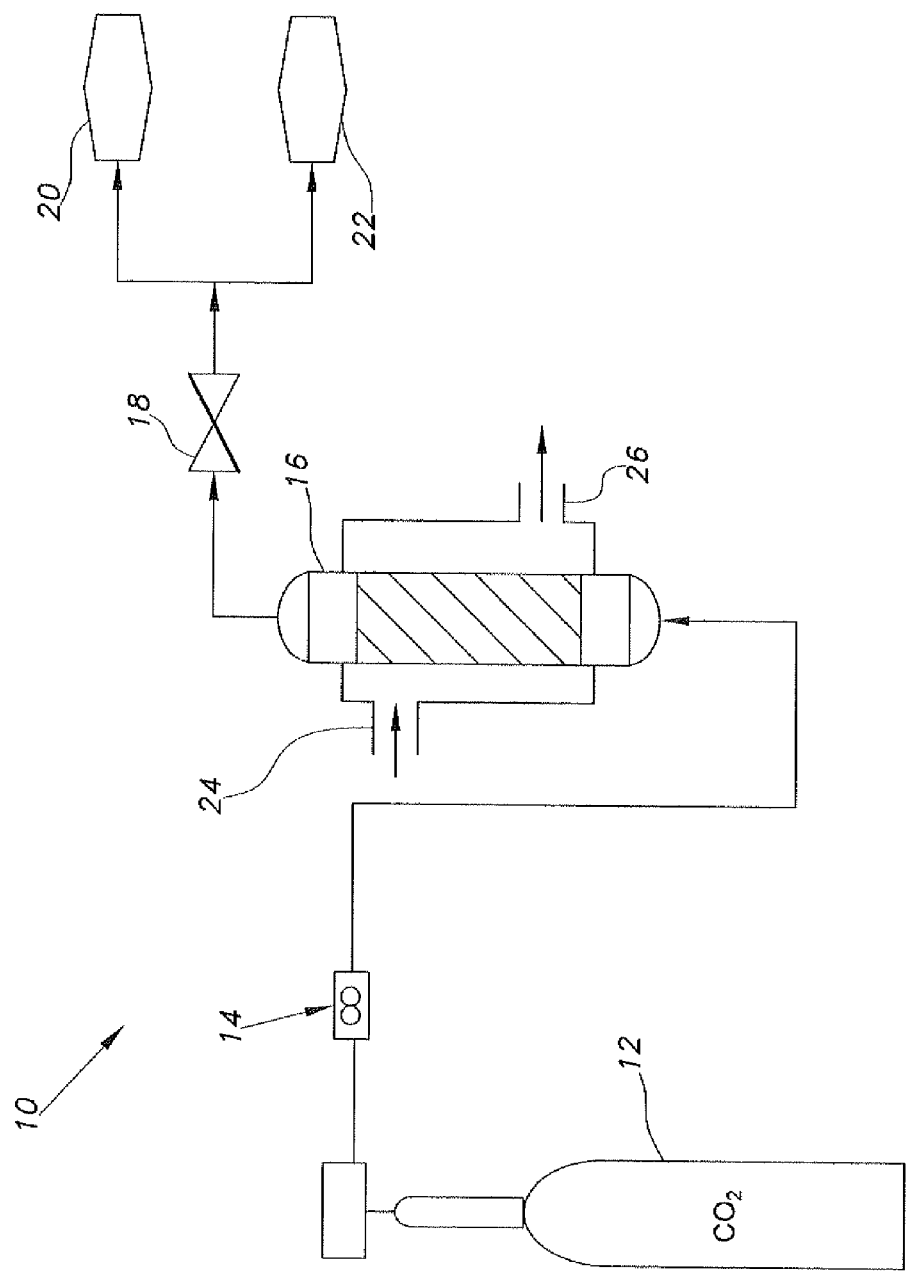
FIG. 1 is a schematic diagram showing an experimental setup for testing the effectiveness of a carbon dioxide adsorbent composition according to the present invention.

FIG. 1 illustrates an experimental setup 10 for testing carbon dioxide adsorption by the resultant composition. An adsorption column 16 is formed from a quartz glass tube having a length of 18 cm and an inner diameter of 1.0 cm. The tube is surrounded by a glass jacket and controlled-temperature water enters through inlet 24 and exits through outlet 26 to circulate through the jacket to maintain isothermal conditions. The adsorption column 16 was filled with 1.5 g of the amine-functionalized oil fly ash.

Nitrogen gas was first introduced to the bed at the bottom of the column 16 to free the surface of the oil fly ash. Carbon dioxide gas, supplied by a pressurized tank 12 and controlled by a flowmeter 14, entered the bed from the bottom of the column 16 at varying flow rates. Valve 18 split the output carbon dioxide flow between a relative humidity meter 22 and a digital carbon dioxide detector 22. The digital carbon dioxide detector 22 measured the output carbon dioxide concentration as a function of time.

The relative humidity was measured at the inlet and outlet of the column using the relative humidity meter 20. To raise the humidity of the inlet gas, the gas was passed through a water bath at 70° C. before passing to the column 16. The experiments were repeated at differing $CO_2$ concentrations, flow rates and temperatures of the bed for both low and high humidity. A further desorption experiment was performed in a similar manner by passing nitrogen gas to the column, and the resulting $CO_2$ concentration was measured as a function of time.

Figure 5:
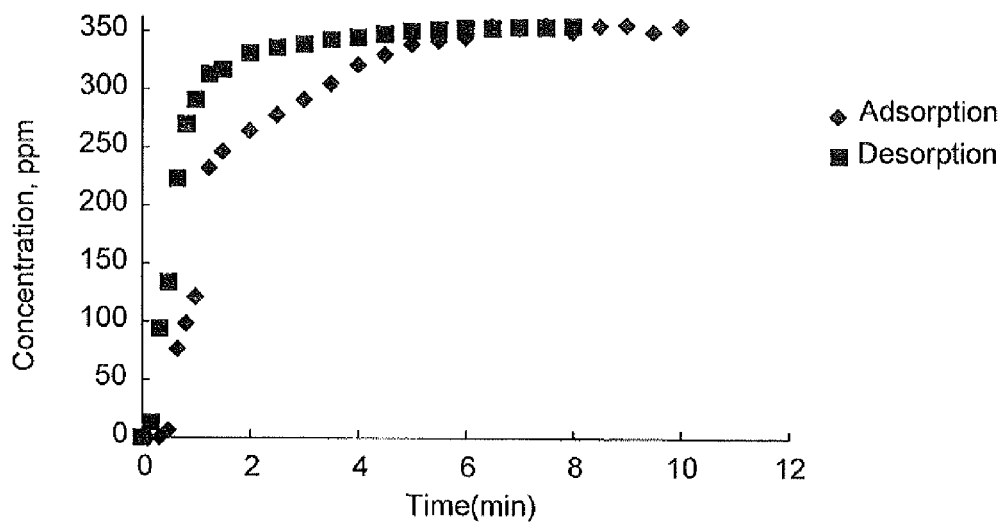
FIG. 5 is a graph showing an adsorption-desorption curve for carbon dioxide adsorption by the carbon dioxide adsorbent composition according to the present invention.
Figure 6:
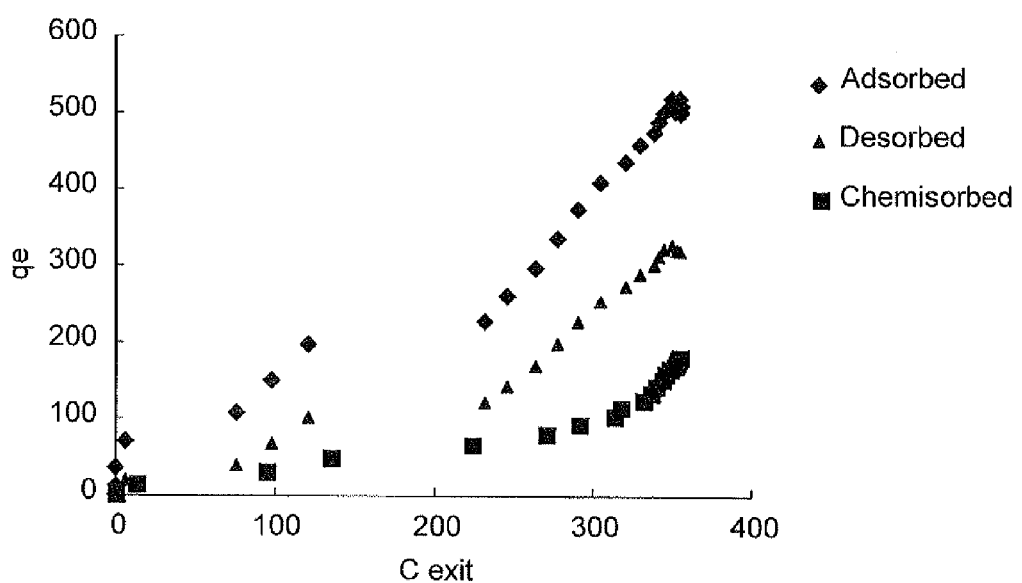
FIG. 6 is a graph showing carbon dioxide adsorption, desorption and chemisorption by the carbon dioxide adsorbent composition according to the present invention.

Plots showing adsorption-desorption and carbon dioxide chemisorption are shown in FIGS. 5 and 6, respectively, for a relative humidity (RH) of 10% RH, a temperature of 40° C., a carbon dioxide concentration of 365 ppm and a flow rate of 0.3 L/min. FIG. 6 is shown as a function of accumulated adsorption capacity (qe). From FIG. 5, the area above the adsorption curve shows the amount adsorbed per unit mass, while the area above the desorption curve shows the amount desorbed. The area therebetween is the amount that reacted (i.e., chemisorbed).

Based on favorable or unfavorable types, the effect of isotherm shape was studied. Treatment of the ash with ammonium hydroxide produced a surface that adsorbed $CO_2$ on the ash surface. This is as a result of multiple layers formed on the surface of the ash. It was found that the multilayer of adsorption takes place as a result of chemical reaction, showing a large difference between the amount adsorbed and desorbed. It can be seen in FIG. 6 that the saturation adsorption capacity that covers a monolayer of adsorption is about 240 mg/g, 90 mg/g for desorption and 50 mg/g for chemisorption.

The flow rate of the carbon dioxide was studied for 0.3, 0.7 and 1.0 L/min over varying carbon dioxide concentrations between 795 ppm and 365 ppm. Increasing the flow rate of the carbon dioxide was found to increase chemical reaction, and thus chemisorption. Peak adsorption was found at a flow rate of 1.0 L/min. Temperature variants were studied for temperatures of –20° C., –10° C., 0° C., 10° C., 20° C., 30° C. and 40° C. Assuming an adsorption time long enough to reach equilibrium, it was further found that adsorption capacity of the treated oil fly ash at low temperatures was greater than that for high temperatures. Peak adsorption rate was found for the lowest temperature studied; i.e., –20° C. Unlike physical adsorption, the endothermic nature of the chemisorption process resulted in increased adsorption with temperature. Thus, the process works for both chemisorption and physiosorption due to the reaction with the base and/or the basic functional groups on the surface. Concentration of the carbon dioxide was varied between 795 ppm and 365 ppm, and increasing the concentration of carbon dioxide was found to increase the adsorption capacity of the treated oil fly ash. Peak adsorption rate was found at a concentration of carbon dioxide of 795 ppm. Similarly, increasing the relative humidity was found to increase the adsorption capacity of the treated oil fly ash. A low relativity humidity of 10% and a high relative humidity of 80% were studied. Peak adsorption was found at the high relative humidity of 80%.

Figure 2:
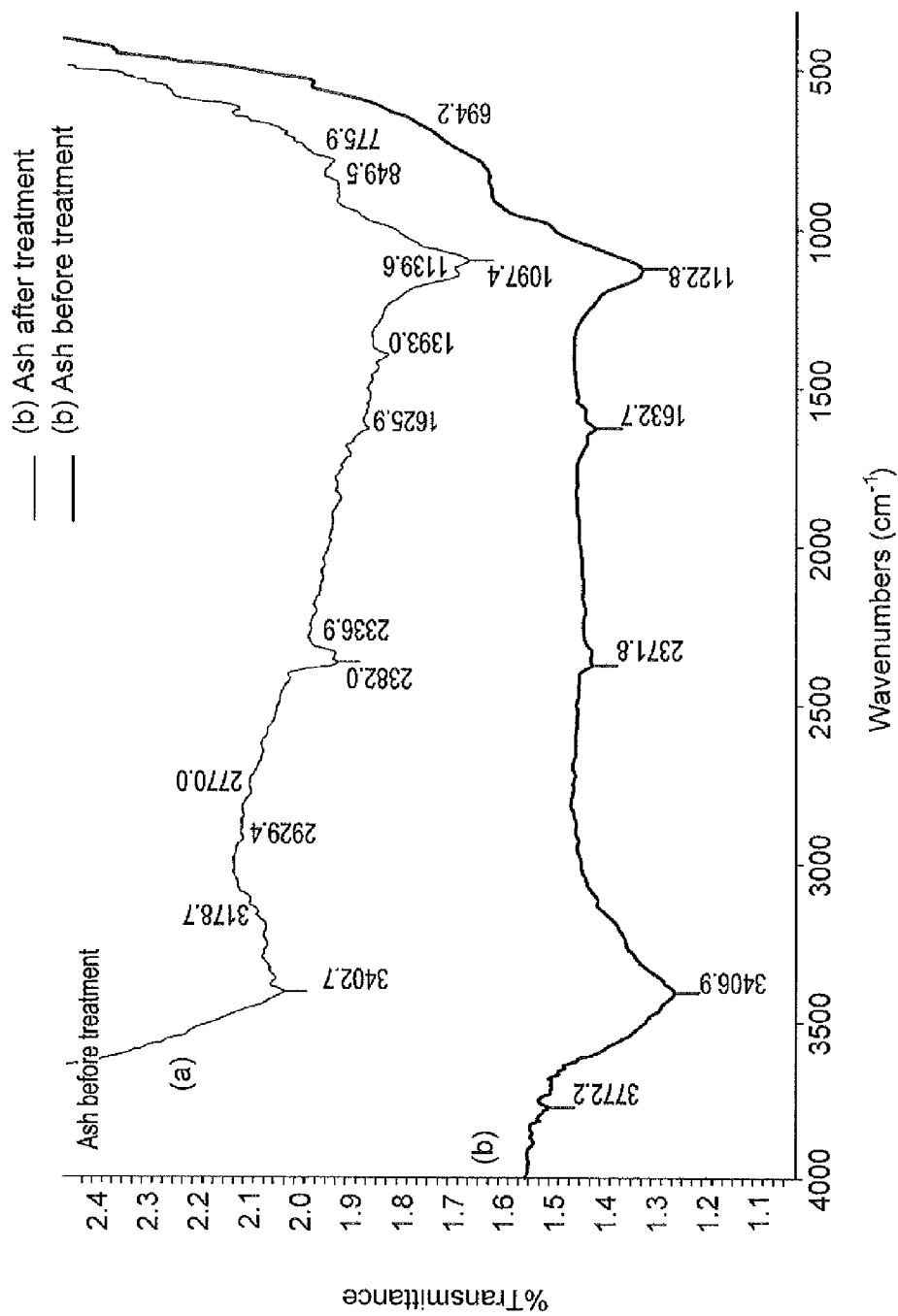
FIG. 2 is a graph showing Fourier transform infrared (FTIR) spectroscopy results on both untreated fly ash and the carbon dioxide adsorbent composition according to the present invention.

In order to determine whether a new functional group was attached to the oil fly ash surface after chemical activation, Fourier transform infrared (FTIR) spectroscopy was used. FIG. 2 shows the FTIR spectra of the oil fly ash before treatment (the "a" curve) compared to the oil fly ash treated with the ammonium hydroxide ($NH_4OH$) solution (the "b" curve) over the range of 4000-400 $cm^{-1}$. The effect of chemical activation is strongly dependent upon the type of activation agent and the physical-chemical nature of the oil fly ash. The $OH^-$ group will attack the surface of the oil fly ash at high alkaline pH during the activation. Further, more surface area will be provided by the corroded surface for further attack by the activating agent, resulting in the formation of amorphous aluminosilicate material.

The IR spectrum of the untreated ash is shown as the "a" curve in FIG. 2. The untreated ash has five major peaks at 1123, 1623, 2371, 3307 and 3772 $cm^{-1}$. These broad peaks are related to C=C, C=O, C≡C, H—C= and O—H functional groups, respectively. For the chemically treated oil fly ash, a broad peak at 3402 $cm^{-1}$ shows the presence of —$NH_2$—, while the peak at 3186 $cm^{-1}$ may be related to —$CONH_2$—. However, the intensities of the untreated ash at 3772 $cm^{-1}$ and 3206 $cm^{-1}$ were reduced after the chemical activation to 3402 and 3186 $cm^{-1}$, respectively, as a result of the heat treatment on the surface of the ash, thereby attaching the amine functional group. A new peak was formed at 1097 $cm^{-1}$ after the chemical treatment, which may be related to C—O. Further, there was a slight decrease in the intensity of the untreated ash at 2371 $cm^{-1}$ to 2333 $cm^{-1}$ for the treated ash. A minor peak was also observed at 1386 $cm^{-1}$, which is attributed to the presence of —O—H functional groups. Therefore, the presence of amine on the surface of the ash is clearly indicated by the FTIR study.

Figure 3:
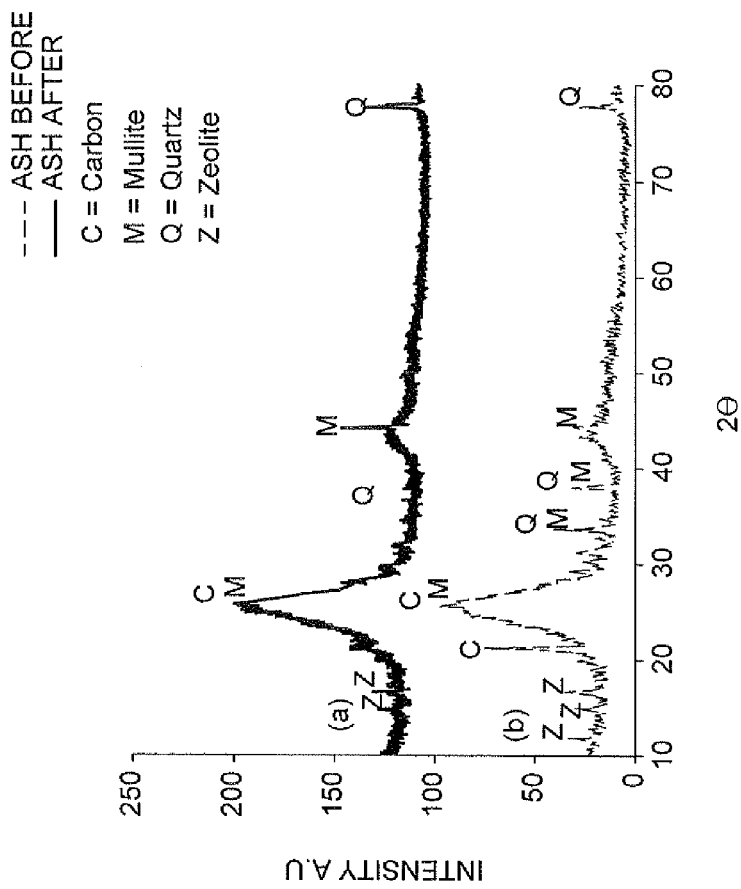
FIG. 3 is a graph showing x-ray diffraction (XDR) results on both untreated fly ash and the carbon dioxide adsorbent composition according to the present invention.

To determine the crystallinity and phases of the treated and untreated samples, X-ray diffraction (XRD) was used. In FIG. 3, XRD patterns show the presence of, zeolite, carbon, quartz, mullite, faujasite, sodalite and canerinite for the untreated fly ash (the "a" curve). The presence of peaks at 11° 2θ, 16° 2θ and 18° 2θ show the presence of zeolite. A very broad peak was seen at 25° 2θ, which shows the presence of carbon and mullite. This indicates the high concentration of crystalline carbon, compared to other minerals. However, minor peaks at 27° 2θ, 33° 2θ and 78° 2θ were detected, corresponding to carbon, mullite, and quartz, respectively. This indicates that mullite and quartz are the two main phases of the crystalline components of the untreated oil fly ash.

In the "b" curve of FIG. 3, XRD patterns show that the alkali-activated oil fly ash mainly consists of quartz and mullite as the major crystalline phases. The peaks at 11° 2θ, 16° 2θ and 18° 2θ were reduced after the chemical treatment, while the intensity of the mullite and carbon peaks at 25° 2θ increased. There was a sharp increase in the peak at 78° 2θ, corresponding to quartz. However, the quartz and mullite peaks between 30° and 40° 2θ decreased or were not visible after the treatment, but the peak at 45° 2θ increased, thus suggesting the presence of mullite.

Energy-dispersive X-ray analysis (EDXA) was used to determine the elemental composition of the untreated oil fly ash and the present functionalized oil fly ash. The EDXA results are shown in Table 1 below.

TABLE 1

Elemental analysis of oil fly ash by EDXA

| Element | Before treatment Weight % | After treatment Weight % |
|---|---|---|
| Carbon | 45.37 | 73.05 |
| Oxygen | 26.46 | 12.33 |
| Sodium | 0.43 | — |
| Magnesium | 0.37 | 0.51 |
| Aluminum | 0.79 | 0.17 |
| Silicon | 9.25 | 0.48 |
| Calcium | 6.38 | — |
| Vanadium | 9.48 | 0.83 |
| Iron | 0.94 | — |
| Sulfur | — | 12.63 |

The pore characteristics, Brunauer-Emmett-Teller (BET) and Langmuir surface areas of the treated and untreated oil fly ash samples are shown in Table 2 below.

TABLE 2

Oil fly ash properties from $N_2$ adsorption

| Sample | BET Surface Area ($m^2/g$) | Langmuir Surface Area ($m^2/g$) | Average Pore Width (4v/A) (Å) | T-plot Micropore Volume ($cm^3/g$) |
|---|---|---|---|---|
| Untreated fly ash | 59 | 78 | 133 | 0.038 |
| Treated fly ash | 318 | 391 | 147 | 0.678 |

Figure 4A:
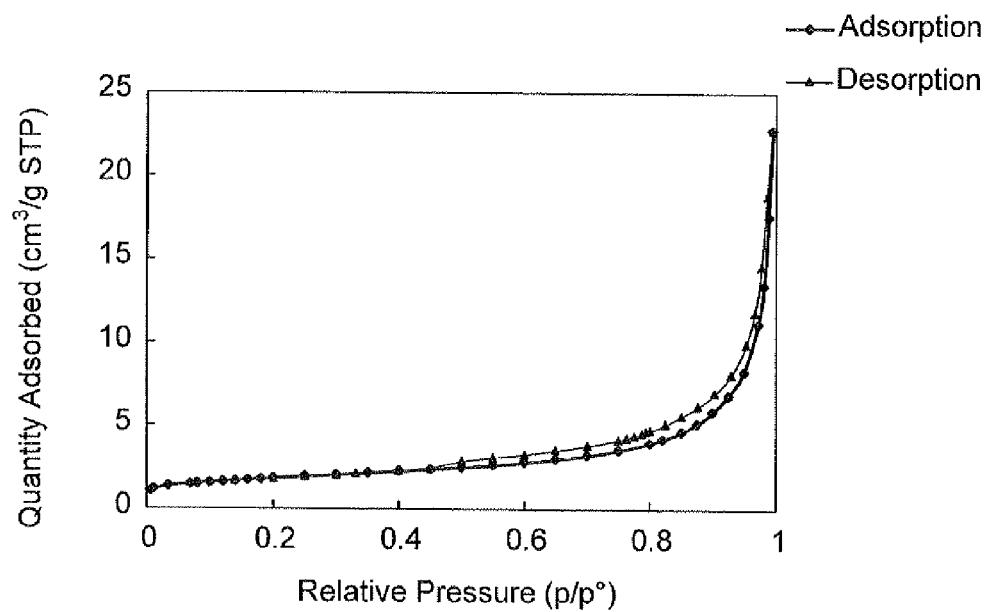
FIG. 4A is a graph showing Brunauer-Emmett-Teller (BET) surface area analysis of untreated fly ash.
Figure 4B:
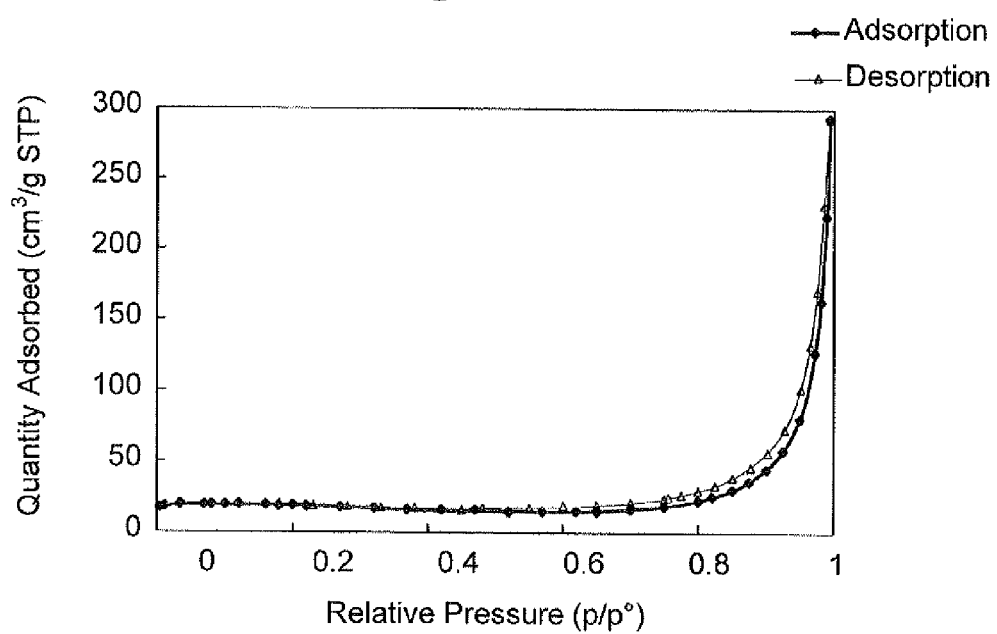
FIG. 4B is a graph showing Brunauer-Emmett-Teller (BET) surface area analysis of the carbon dioxide adsorbent composition according to the present invention.

FIGS. 4A and 4B show the adsorption-desorption isotherms of $N_2$ at 77 K for the untreated and treated oil fly ash samples, respectively. The characteristics of the material are formed from slit shaped pores. The distribution of the pore sized is principally micoporous. It can be seen that this isotherm belongs to type I in the IUPAC classification. The BET surface area increased from 59 $m^2/g$ for untreated ash to 318 $m^2/g$ after chemical activation. Further, the pore volume increase substantially from 0.036795 $cm^3/g$ to 0.678627 $cm^3/g$. Thus, carbon dioxide adsorption capacity improved as a result of the improved characteristics.

The high BET surface area and total pore volume of the treated oil fly ash was due to the activation process used, which involved chemical activation with $NH_4OH$. The average pore diameter varied from 132.8 Å for the untreated sample to 147.0658 Å for the treated ash. Pore development was also important in achieving large surface area, along with volume of the ash, which promotes the diffusion of ammonium hydroxide into the pores, thus creating more $NH_4OH$ carbon reactions, which, in turn, created more pores in the ash.

To determine the qualitative and morphological characteristics of the oil fly ash, a scanning electron microscope (SEM) was used. The dried sample was fixed and carbon-coated with double-sided masking tape to make its surface conductive. This sample was viewed on the SEM at different magnifications to see the surface topography of the sample. From the surface morphology of the ash samples, most of the ash particles were found to be spherical in shape with high porosity. For the untreated ash, the surfaces were blocked with particles of calcium and were found to have less porosity. The particles had sizes in the range of 10-100 μm. The treated fly ash was found to have more opened micropores with well-defined particle sizes and porous structures resulting from the alkaline activation. It was seen that well-developed pores led to the large surface area and porous structure of the functionalized fly ash.

It is to be understood that the present invention is not limited to the embodiments described above, but encompasses any and all embodiments within the scope of the following claims.

We claim:

1. A carbon dioxide adsorbent composition formed by a process comprising the steps of:
    mixing fly ash with ammonium hydroxide;
    refluxing the mixture of fly ash and ammonium hydroxide at about 120° C.;
    cooling the mixture of fly ash and ammonium hydroxide to room temperature;
    adding additional ammonium hydroxide to the cooled mixture of fly ash and ammonium hydroxide to form a secondary mixture;
    filtering a carbon dioxide adsorbent composition precipitant from the secondary mixture; and
    to drying the carbon dioxide adsorbent composition.

2. The carbon dioxide adsorbent composition according to claim 1, wherein said mixing step further comprises mixing fly ash and ammonium hydroxide in a weight/volume ratio of about 100 g fly ash/300 ml ammonium hydroxide.

3. The carbon dioxide adsorbent composition according to claim 1, wherein said refluxing step is performed for a period of about 24 hours.

4. The carbon dioxide adsorbent composition according to claim 1, wherein said step of adding additional ammonium hydroxide comprises adding ammonium hydroxide to the cooled mixture in a volume of about one-half the volume of ammonium hydroxide used in said mixing step.

5. A method of removing carbon dioxide from a stream of gas being emitted to the atmosphere, comprising the step of passing the stream of gas through a filter containing the carbon dioxide absorbent composition according to claim 1.

6. A method of making a carbon dioxide adsorbent composition from fly ash, comprising the steps of:
    mixing fly ash with ammonium hydroxide;
    refluxing the mixture of fly ash and ammonium hydroxide at about 120° C.;
    cooling the mixture of fly ash and ammonium hydroxide to room temperature;
    adding additional ammonium hydroxide to the cooled mixture of fly ash and ammonium hydroxide to form a secondary mixture;
    filtering a carbon dioxide adsorbent composition precipitant from the secondary mixture; and
    drying the carbon dioxide adsorbent composition.

7. The method of making a carbon dioxide adsorbent composition from fly ash as recited in claim 6, wherein said mixing step further comprises mixing fly ash and ammonium hydroxide in a weight/volume ratio of about 100 g fly ash/300 ml ammonium hydroxide.

8. The method of making a carbon dioxide adsorbent composition from fly ash as recited in claim 6, wherein said refluxing step is performed for a period of about 24 hours.

9. The method of making a carbon dioxide adsorbent composition from fly ash as recited in claim 6, wherein said step of adding additional ammonium hydroxide comprises adding ammonium hydroxide to the cooled mixture in a volume of about one-half the volume of ammonium hydroxide used in said mixing step.

* * * * *